(No Model.) 2 Sheets—Sheet 1.

J. R. MORGAN.
CAR WHEEL.

No. 278,726. Patented June 5, 1883.

(No Model.)  J. R. MORGAN.  2 Sheets—Sheet 2.
CAR WHEEL.

No. 278,726.  Patented June 5, 1883.

Witnesses  George Cook  Inventor
S. G. Nottingham  John R. Morgan

UNITED STATES PATENT OFFICE.

JOHN R. MORGAN, OF ALLIANCE, OHIO.

CAR-WHEEL.

SPECIFICATION forming part of Letters Patent No. 278,726, dated June 5, 1883.

Application filed February 23, 1883. (No model.)

*To all whom it may concern:*

Be it known that I, JOHN R. MORGAN, of Alliance, in the county of Stark and State of Ohio, have invented certain new and useful Improvements in Car-Wheels; and I do hereby declare the following to be a full, clear, and exact description of the invention, such as will enable others skilled in the art to which it pertains to make and use the same.

My invention relates to an improvement in railroad-car wheels.

Heretofore various plans have been devised for the construction of compound railway-wheels for the purpose of relieving the wheel and rail of the jar or concussive strain to which they are subjected. This has generally been accomplished by inserting an annular wooden portion between the tire and body of the wheel and securing the parts together by numerous bolts. This method is objectionable in that it makes a very expensive wheel, and should the tire break it flies off in many pieces, causing much damage and occasionally wrecking a whole train.

The object of my invention is to obviate the objection above noted by constructing a separable compound wheel without bolts and one that can be manufactured at a small initial cost; and with these ends in view my invention consists in the parts and combination of parts, as will be more fully described, and pointed out in the claims.

Figure 1:
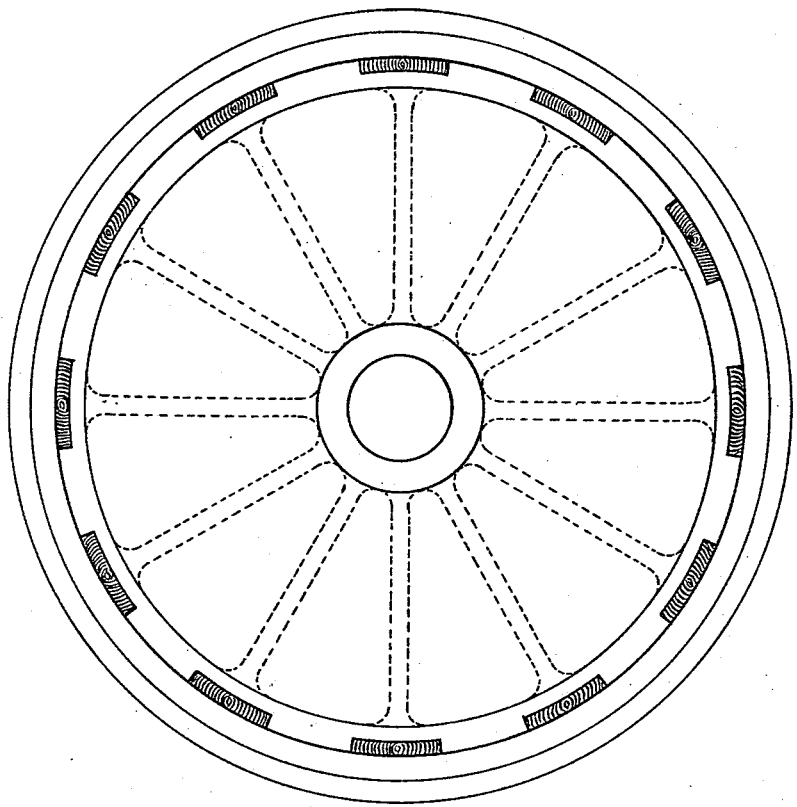
Figure 2:
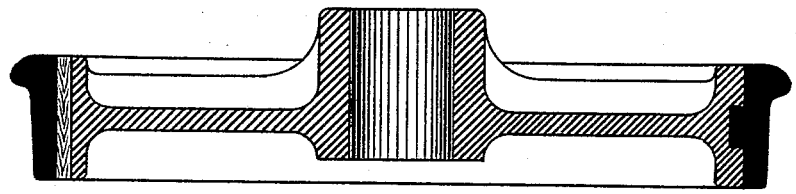
Figure 3:
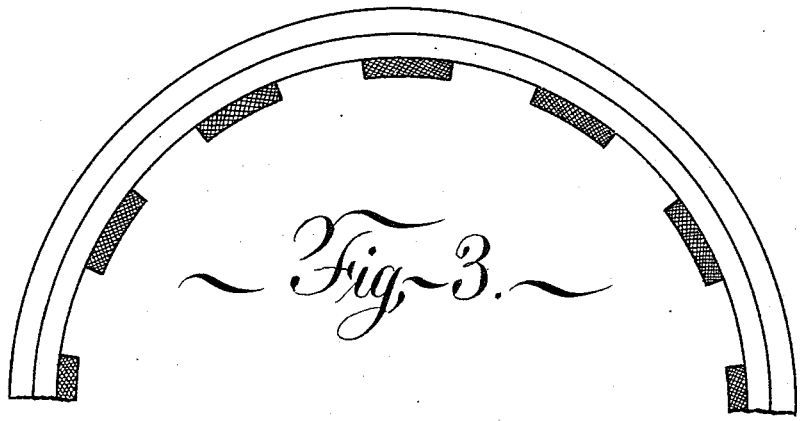
Figure 4:
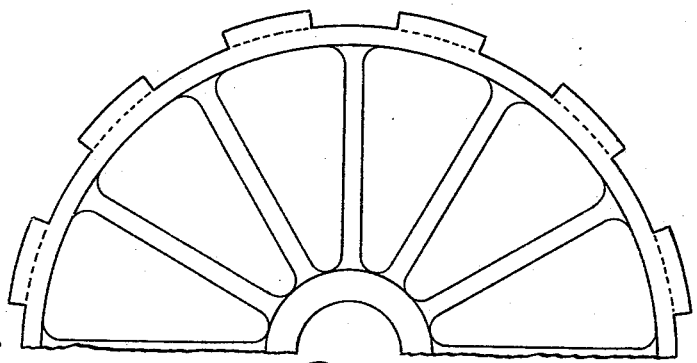
Figures 5, 6:
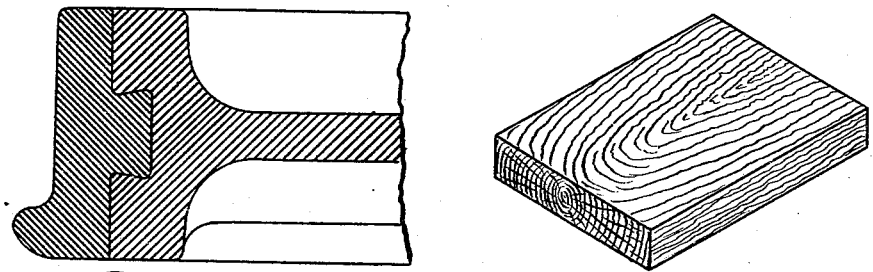

In the accompanying drawings, Figure 1 is a view in side elevation of my improvement. Fig. 2 is a transverse sectional view of the same. Fig. 3 is a detached view of a portion of the tire or tread. Fig. 4 is a similar view of the body. Fig. 5 is an enlarged sectional view, showing the manner of joining the tire to the body; and Fig. 6 is an isometrical view of one of the cushions.

A represents the body of the car-wheel, preferably made of soft cast-steel, of any desired design, and provided on its rim or periphery with two series of projections, C', separated by a central groove or channel, B, in which the inwardly-projecting lugs C of the tire D rest. The lugs C' on the same side of the body are arranged equidistant apart on the periphery of the body, the space between them registering with and of sufficient size for the passage of the inwardly-projecting lugs C of the tire D. The lugs C' on the opposite side of the body of the wheel are also arranged in a similar manner, so that the body of the wheel can be passed completely through the tire without difficulty. The inner side of the lugs C' are cut away or inclined from the top inwardly, forming a wedge-shaped groove, B, which corresponds in shape to lugs C of the tire D. The lugs C, as before stated, correspond in number, size, and position to the spaces between the lugs C', and readily move between them.

To secure the parts together, the body of the wheel is placed on a suitable bed in a horizontal position. The tire is then elevated slightly above the body and turned or moved until the projections C correspond or register with the spaces between the lugs C'. The tire is then lowered until the lugs C are in line with the peripheral channel B, when the tire is turned or partly rotated on the body, so as to bring the lugs C between the lugs C' on opposite sides of the body, thereby forming a dovetail joint, which prevents the tire from flying apart in case it should be accidentally broken. When the parts are thus placed, the spaces between the lugs C of the tire and the lugs C' of the body register, leaving openings extending from one side of the wheel to the other, into which the wooden cushions E are driven. These cushions E are preferably made of hickory, and are shaped to snugly fit within openings, to prevent the tire from moving independently of the body. These blocks are then dipped into white lead and driven into place, after which the ends are trimmed off, if necessary. This entire operation is performed while the parts are cold, and hence the necessity of heating the tire for shrinking it on the body and the extra expense incidental thereto are avoided. The tire can be removed from the body at any time for the purpose of replacing it by a new one, or for repair, by simply driving out or burning up the wooden blocks or cushions and turning the tire until the lugs C again register with the spaces between the lugs C'.

My improved wheel can be made with a cast-iron body and hammered-steel tire, or the parts can be made of steel, as before stated.

Instead of making the two rows of projections C' on the opposite sides of the body of the wheel, and one row C in the center of the tire, the arrangement can be reversed and answer all necessary purposes.

By this construction of parts I not only insure great simplicity and sufficient economy in manufacture, but also durability and efficiency in use.

It is evident that slight changes in the construction and relative arrangement of the several parts might be resorted to without departing from the spirit of my invention; and hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. A car-wheel consisting of the body and tire provided with interlocking lugs to prevent lateral displacement of the tire, and having wooden cushions secured between the tire and body within the spaces between said interlocking lugs, substantially as set forth.

2. A car-wheel consisting of the body portion having recesses formed in its rim opposite the ends of the spokes, and provided with outwardly-projecting lugs on opposite edges of its rim, and a central groove or channel, in combination with the tire provided with lugs that fit between those in the body, and wooden cushions secured between the tire and the body, and within the recesses in the rim of the body portion of the wheel, substantially as set forth.

In testimony whereof I have signed this specification in the presence of two subscribing witnesses.

JOHN R. MORGAN.

Witnesses:
 WALTER THOMAS,
 L. K. MORGAN.